United States Patent [19]

Im

[11] Patent Number: 5,505,669
[45] Date of Patent: Apr. 9, 1996

[54] POWER TRANSMISSION AND CLUTCH DEVICE

[76] Inventor: Kwan-Soon Im, 79 Fortieth St., Etobicoke, Ontario, Canada, M8W 3M8

[21] Appl. No.: 269,038

[22] Filed: Jun. 30, 1994

[51] Int. Cl.⁶ .................................................. F16H 3/44
[52] U.S. Cl. ........................................ 475/306; 475/314
[58] Field of Search ..................................... 475/306, 311, 475/312, 314

[56] References Cited

U.S. PATENT DOCUMENTS

| | | |
|---|---|---|
| 698,494 | 4/1902 | Herschmann . |
| 917,729 | 4/1909 | Henroid ................................. 475/314 |
| 1,017,954 | 2/1912 | Cake . |
| 1,083,729 | 1/1914 | Collischonn . |
| 1,125,282 | 1/1915 | Fergodo ................................. 475/314 |
| 1,208,329 | 12/1916 | Kincannon . |
| 1,303,660 | 5/1919 | Harger . |
| 1,304,052 | 5/1919 | Hurtig et al. . |
| 1,388,303 | 8/1921 | Pulliam ................................. 475/306 |
| 2,124,116 | 7/1938 | Moore ................................... 475/311 |
| 2,177,872 | 10/1939 | Dunn ..................................... 475/314 |
| 2,399,097 | 4/1946 | Carnagua ............................... 475/314 |
| 2,486,269 | 10/1949 | Fawick ................................... 475/306 |
| 2,744,421 | 5/1956 | Lammerz . |
| 3,119,281 | 1/1964 | Gerber et al. . |
| 3,138,960 | 6/1964 | Moo . |
| 4,392,832 | 7/1983 | Moberg .................................. 475/306 |

FOREIGN PATENT DOCUMENTS

| | | |
|---|---|---|
| 2650357 | 7/1989 | France . |
| 1138597 | 10/1962 | Germany . |
| 2713264 | 9/1977 | Germany ................................. 475/311 |
| 2-186150 | 7/1990 | Japan . |
| 159877 | 4/1933 | Switzerland . |
| 23874 | of 1906 | United Kingdom . |

*Primary Examiner*—Dirk Wright
*Attorney, Agent, or Firm*—Riches, McKenzie & Herbert

[57] ABSTRACT

This invention relates to a power transmission device for coupling an input or driving shaft with an output or driven shaft. The power transmission device permits the output shaft to be engaged or disengaged from the input shaft. The device comprises a first side gear mechanically connected to the output shaft and a second side gear mechanically coupled to a brake which can decrease the rate of rotation of the second side gear to zero. In one embodiment, the gear ratio between the first side gear and the second side gear is greater than one. The device further comprises carried gears rotatably engageably coupled with the first and second side gears such that the carried gears rotate between and around the first and second side gears. The carried gears are carried by a gear carrier. The carried gears are mechanically connected to the gear carrier such that rotation of the input shaft on its axis causes the gear carrier to carry the carried gears around the first and second side gears. In operation, when the brake does not resist the rotation of the second side gear, the output shaft is disengaged from the input shaft. When the brake resists the rotation of the second side gear, the output shaft becomes engaged to the input shaft and rotates at a greater rate of rotation than the input shaft. In another embodiment, the invention further comprises a lock-up clutch means which couples the second side gear to the gear carrier so that the output shaft will rotate at the same rate of rotation as the input shaft regardless of the gear ratio of the first side gear to the second side gear.

20 Claims, 7 Drawing Sheets

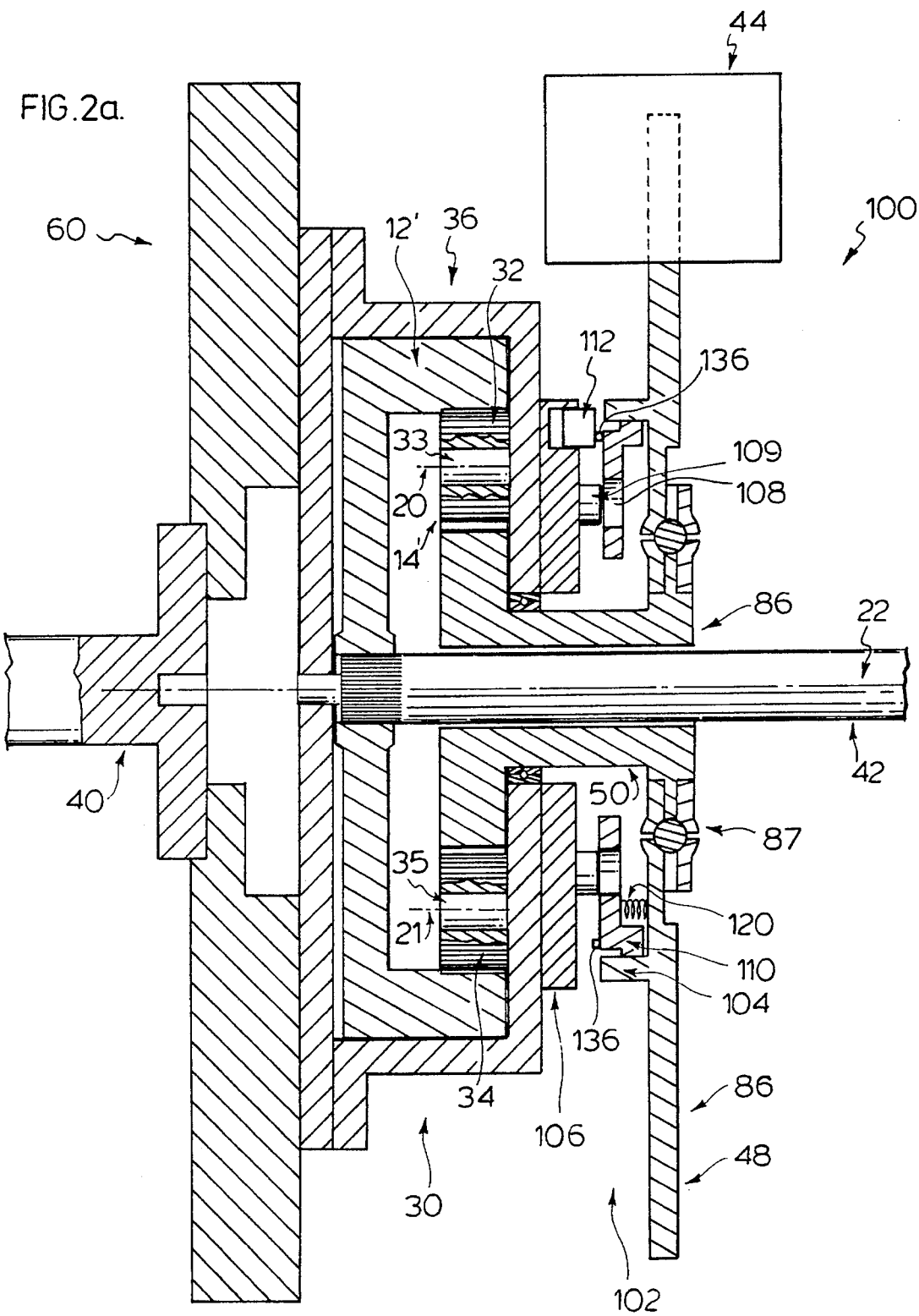

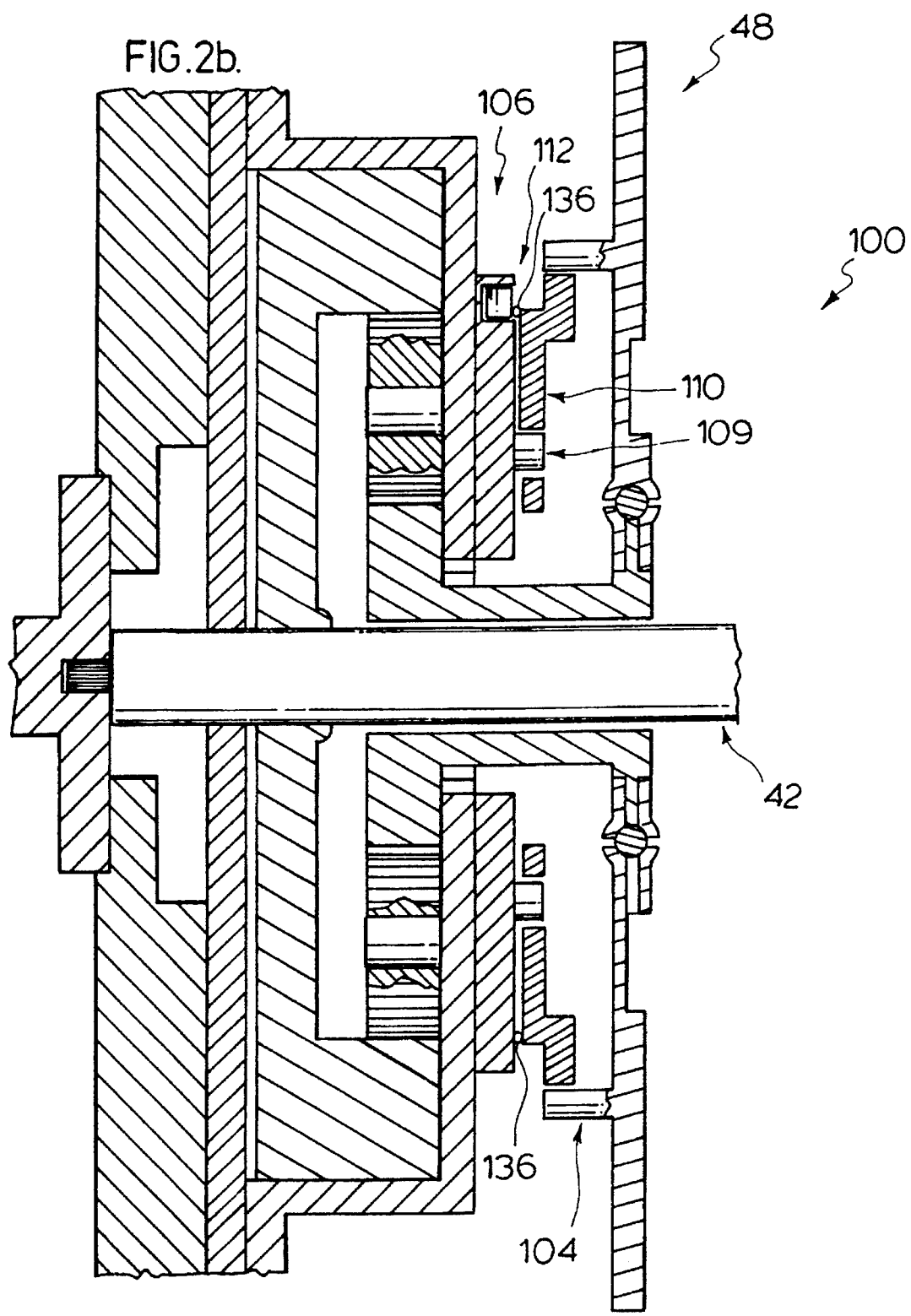

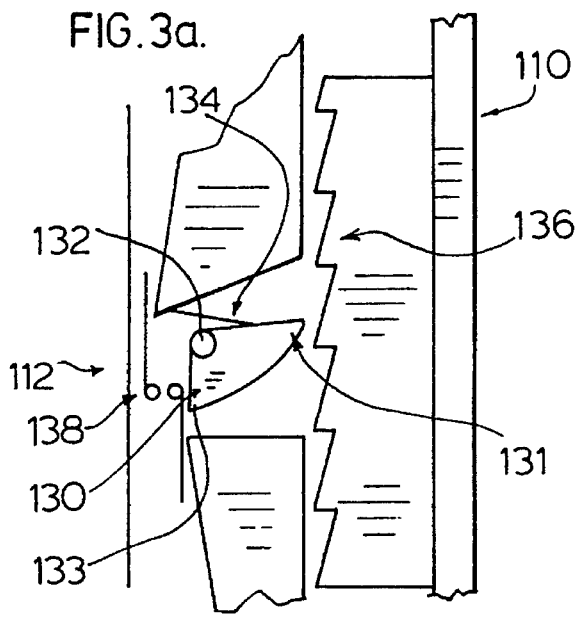
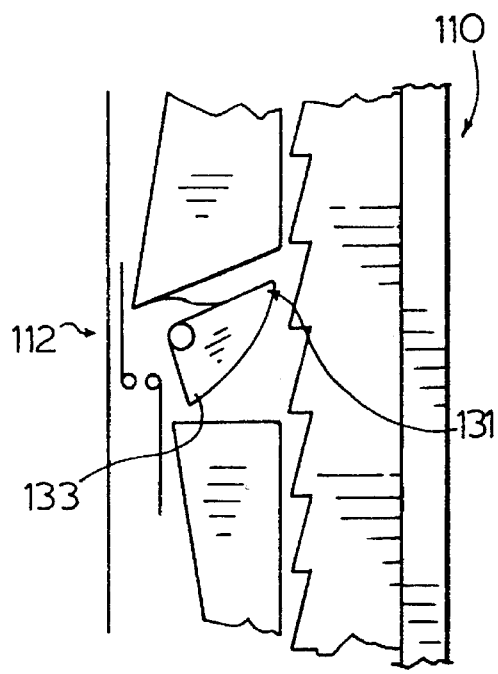
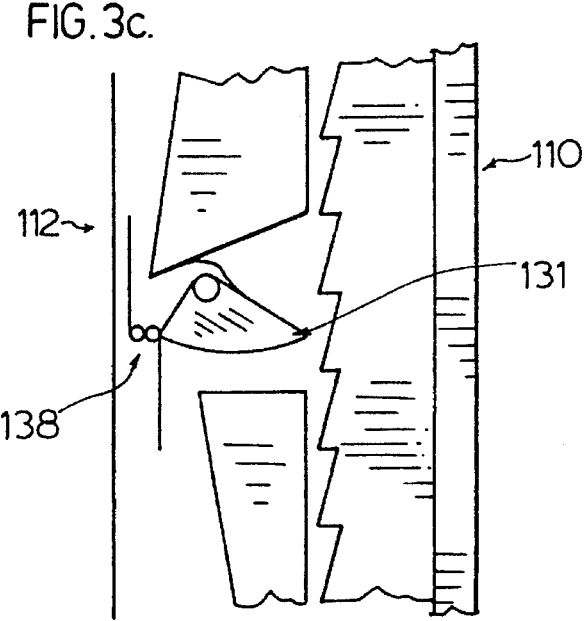

1

POWER TRANSMISSION AND CLUTCH DEVICE

BACKGROUND OF THE INVENTION

This invention relates to the field of power transmission devices and in particular power transmission devices in automobiles used to disengage the motor from the transmission in order to effect a gear change.

In the past, power transmission devices have included friction clutches in which two rotating plates are rotated together when frictionally engaged. The plates were separated from each other in order to disengage the motor from the transmission and effect a gear change. Such friction clutches suffer from several disadvantages such as poor control over the re-engagement of the motor, an abrupt re-engagement, and excessive wear due to the interaction of the rotating plates.

Furthermore, the friction clutches do not provide for a means of increasing the rate of rotation of the output shaft to the transmission above the rate of rotation of the input shaft from the car's motor.

SUMMARY OF THE INVENTION

Accordingly, it is an object of this invention to at least partially overcome the disadvantages of the prior art. Also, it is an object of this invention to provide an alternative type of power transmission device. This type of power transmission device would provide for smoother engagement and disengagement, increased control to the driver over the re-engagement, and an ability to drive the output shaft above the rotational velocity inputted to the input shaft from the engine.

Accordingly, in one of its broad aspects, this invention resides in providing a power transmission device comprising:

first sun gear means rotatable about a second axis of rotation;

second sun gear means rotatable about the second axis; and planetary gear carrier means rotatable about the second axis, carrying first planetary gear means rotatable thereon about a first axis of rotation axis and disposed between the first sun gear means and the second sun gear means and rotatably engageably coupled to both the first sun gear means and the second sun gear means;

a power input shaft capable of rotating said planetary gear carrier means about said second axis at a rate of rotation;

a power output shaft mechanically connected to said first sun gear means and capable of turning at a rate of rotation in a first direction;

braking means mechanically associated with said second sun gear means and capable of decreasing a rate of rotation of said second sun gear means in said first direction toward zero; and wherein when the braking means decreases the rate of rotation of said second sun gear means in the first direction there is a corresponding increase in the rate of rotation of said power output shaft in the first direction.

Further aspects and advantages of the invention will become apparent upon reading the following detailed description and the drawings which illustrate the invention and preferred embodiments of the invention.

It is understood that while the present invention will be described in terms of a power transmission device used in automobiles, the present device can relate to any type of power transmission device wherein a driving shaft must be engaged and disengaged with a driven shaft.

BRIEF DESCRIPTION OF THE DRAWINGS

In the drawings, which illustrate embodiments of the invention:

FIGS. 2(a) and 2(b) are diagrams showing a second embodiment of the present invention;

FIGS. 3(a), 3(b) and 3(c) are diagrams showing a switching mechanism for use in one embodiment of the present invention;

DETAILED DESCRIPTION OF PREFERRED EMBODIMENTS OF THE INVENTION

Figure 1:
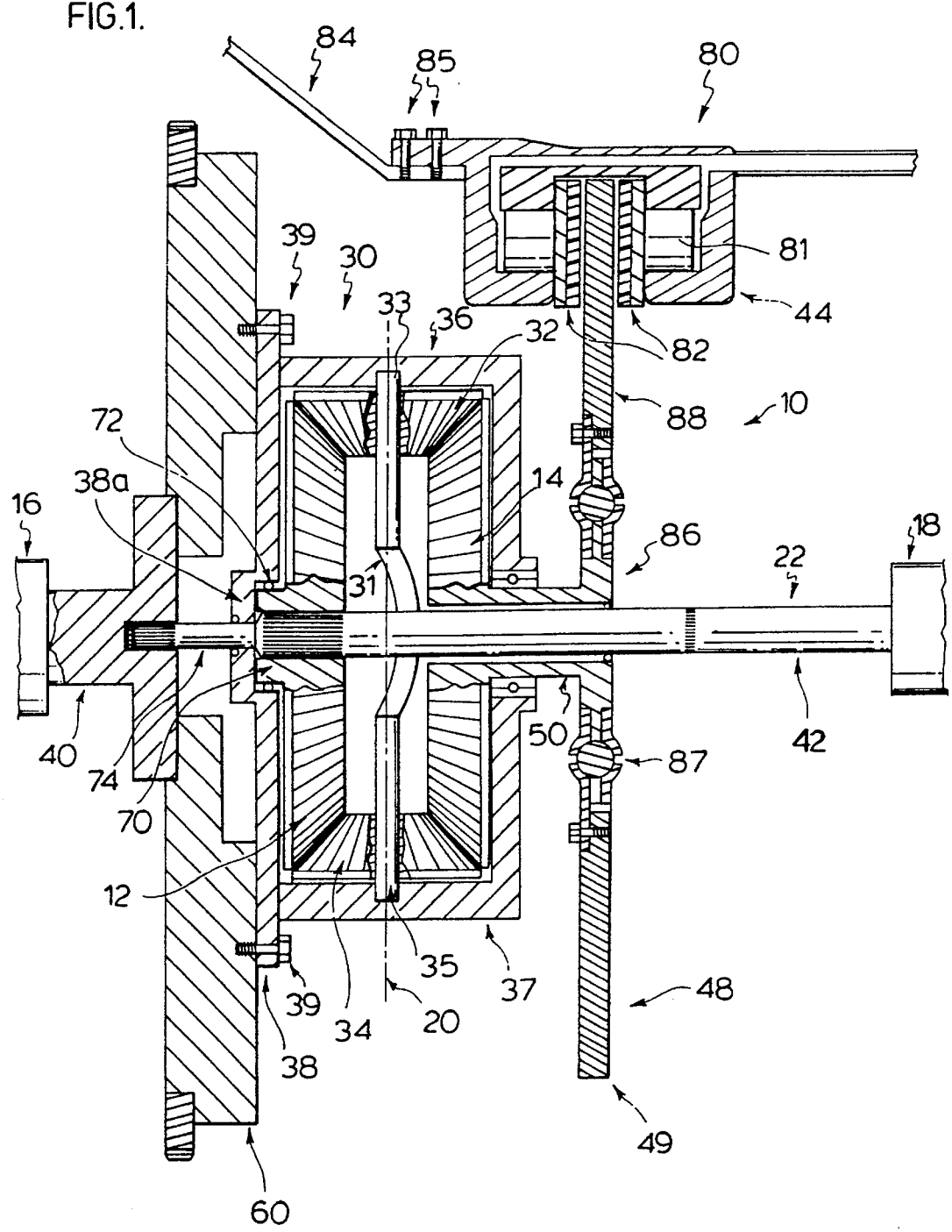
FIG. 1 is a diagram of a first embodiment of the present invention.

Reference is made to FIG. 1 which shows a power transmission device, shown generally as 10, according to one embodiment of the present invention. The power transmission device 10 includes a first side gear 12 and a second sun gear 14. Both the first and second side gears 12 and 14 are rotatable about a second axis of rotation 22. In this embodiment, the first and second side gears 12 and 14 have the same diameter and are mitre shaped.

This embodiment of the present invention further comprises a first carried gear 32 and a second carried gear 34 which are pinion gears. The first and second carried gears 32 and 34 are disposed between the first and second side gears 12 and 14 and are rotatably engageably coupled to the first and second side gears 12 and 14. In other words, the notches of the carried gears 32 and 34 mesh with the notches of both the first and second side gears 12 and 14, simultaneously. However, the notches of the first and second side gears 12 and 14 do not mesh directly with each other.

As shown in FIG. 1, the device 10 has an input shaft 40 which is rotated about the second axis 22 by an engine 16. The input shaft 40 causes the carried gears 32 and 34 to rotate about the second axis 22 and mesh with first and second side gears 12 and 14. The second side gear 14 is connected to a disc 48. A brake 44 can engage the disc 48 to control the rate of rotation of the disc 48 and the second side gear 14. The first side gear 12 is connected to an output shaft 42 which can output mechanical power from the device 10 to a mechanical load, such as a transmission 18. The operation of these respective elements will now be described in more detail.

As shown in FIG. 1, the first and second side gears 12 and 14 and the first and second carried gears 32 and 34 are contained within a gear casing 36. The first and second carried gears 32 and 34 are mechanically connected to the gear casing 36 by means of a first axle 33 and a second axle 35, respectively, which are mechanically connected to the casing 36.

The first and second carried gears 32 and 34 are rotatable about a first axis 20 which is transverse to the second axis 22. The first and second axles 33 and 35 are coincident with the first axis 20 such that the first and second carried gears 32 and 34 rotate about the first axis 20 by rotating on axles 33 and 35.

The carried gears 32 and 34 rotate about the first axis 20 while simultaneously being moved around the second axis 22 by the gear casing 36. In other words, the axles 33 and 35 and the gear casing 36 comprise a planetary gear carrier, shown generally as 30, which carries the carried pinion gears 32 and 34 about the second axis 22. Because the carried gears 32 and 34 mesh with the first and second side gears 12 and 14, movement of the carried gears 32 and 34 about the second axis 22 by the carried gear carrier 30 causes the carried gears 32 and 34 to rotate about the first axis 20.

The axles 33 and 35 are connected to each other by the annular member 31. As shown in FIG. 1, the output shaft 42 is journaled through the annular member 31.

For ease of assembly, the gear casing 36 is formed from two separate members, for instance a C-shaped member 37 and a plate 38 as shown in FIG. 1. It is understood that the C-shaped member 37 and the plate 38 may be connected to each other by any known means such as by being bolted on or welded together.

The gear casing 36 is attached to a flywheel 60 by means of bolts 39 mechanically connecting the plate 38 to a flywheel 60 as shown in FIG. 1. The flywheel 60 rotates about the second axis 22 and is used as an inertial weight in a known manner. It is apparent that the gear casing 36 will rotate with the flywheel 60 because it is mechanically coupled to the flywheel 60. This arrangement is preferable because the inertial mass of the casing 36, carried gears 32 and 34 and axles 33 and 35 are added to the inertial mass of the flywheel 60. Therefore, a smaller and lighter flywheel 60 can be used with the same overall effect because of the additional inertial mass of the casing 36, carried gears 32 and 34 and axles 33 and 35.

The flywheel 60 in turn is connected to the power input shaft 40. The power input shaft 40 is a driving shaft and is mechanically connected to the engine 16 which can turn the power input shaft 40 about the second axis 22 at a rate of rotation and in a first direction. Accordingly, when the engine turns the power input shaft 40 in a first direction, the power input shaft 40 rotates the flywheel 60, the gear casing 36, the axles 33 and 35, and the carried gears 32 and 34 about the second axis 22. It is also apparent that these elements will always rotate about the second axis 22 at the same rate of rotation and in the same direction as the input shaft 40.

In operation, the first and second side gears 12 and 14 and the gear carrier 30 work as follows. If the rotation of any one of the first side gear 12, second side gear 14 or gear carrier 30 around the second axis 22 is stopped, then the other two may still rotate. However, if the rotation of any two of the first side gear 12, the second side gear 14 or the gear carrier 30 is stopped, then both side gears 12 and 14 and the gear carrier 30 will stop rotating with respect to each other.

Furthermore, if either the first side gear 12 or the second side gear 14 is coupled to the gear carrier 30, the carried gears 32 and 34 would be prevented from rotating about the first axis 20. In this case, there would be no relative movement between the first side gear 12, the second side gear 14 and the gear carrier 30. However, the first and second side gears 12 and 14, the gear carrier 30 and the carried gears 32 and 34 would move around the second axis 22 in unison and at the same rate of rotation as the input shaft 40.

When the power input shaft 40 rotates about the second axis 22, it causes the gear carrier 30 to carry the first and second carried gears 32 and 34 about the second axis 22, as discussed above. Movement of the carried gears 32 and 34 about the second axis 22 will cause the carried gears 32 and 34 to mesh with both the first side gear 12 and the second side gear 14. In this way, the carried gears 32 and 34 will cause the first side gear 12, the second side gear 14, or both side gears 12 and 14, to rotate about the second axis 22. Which side gear 12 and 14 rotates, as well as the rate of rotation, will depend on the relative resistance to rotation between the two side gears 12 and 14.

For example, if the first side gear 12 is held stationary, then the rotation of the gear carrier 30 and the carried gears 32 and 34 around the second axis 22 will cause the second side gear 14 to rotate about the second axis 22 in the first direction. Alternatively, if the second side gear 14 is held stationary then the rotation of the carried gear carrier 30 and the carried gears 32 and 34 around the second axis 22 will cause the first side gear 12 to rotate about the second axis 22 in the first direction.

If the resistance to rotation of the first side gear 12 is about the same as the resistance to rotation of the second side gear 14, then both the first and second side gears 12 and 14 will rotate when the gear carrier 30 rotates around the second axis 22 in the first direction. If both the first and second side gears 12 and 14 are held stationary then the first and second carried gears 32 and 34 will not be able to rotate about the second axis 20 and the device 10 will seize.

Referring to FIG. 1, the first side gear 12 is mechanically connected to the output shaft 42. The power output shaft 42 rotates in the same direction and at the same rate of rotation as the first side gear 12 about the second axis 22.

The second side gear 14 in this embodiment is toroidally shaped to permit the output shaft 42 to pass therethrough. The output shaft 42 is journaled coaxially within and through the toroidally shaped second side gear 14 and extends to the transmission 18.

The output shaft 42 is a driven shaft and it outputs power from the device 10 to the mechanical load. If the device 10 is installed in an automobile, the mechanical load will be the transmission 18 of the automobile, or, it could be the actual wheels of the car if the car had no transmission. In operation, the mechanical power outputted by the device 10 through the output shaft 42 to the mechanical load will be controlled by controlling the rate of rotation of the second side gear 14. The rate of rotation of the second side gear 14 can be controlled by means of the brake 44 acting on the disc 48 as described below.

As shown in FIG. 1, the disc 48 is mechanically connected to the second side gear 14 by a first hollow shaft 50 which is located coaxially about the output shaft 42. The second side gear 14 is mechanically connected to the disc 48 so that the side gear 14 will rotate about the second axis 22 at the same rate of rotation and in the same direction as the disc 48. The first hollow shaft 50 has bearing means, such as ball bearings, to mechanically separate the hollow shaft 50 from the output shaft 42 and the casing 36.

The disc 48 is associated with the brake 44 and the second side gear 14 such that the brake 44 can cause the rate of rotation of the second side gear 14 to decrease by decreasing the rate of rotation of the disc 48. The brake 44 can reduce the rate of rotation of the disc 48, and therefore the second side gear 14, to zero by holding the disc 48 stationary.

The brake 44 comprises a frictional brake 80 to decrease the rate of rotation of the disc 48 and the second side gear 14. The frictional brake 80 comprises pistons 81 having shoe and lining assemblies 82. It is preferable that the pistons 81 and the shoe and lining assemblies 82 be oriented on opposite sides and symmetrically about the disc 48.

In operation, when the rate of rotation of the disc 48 is to be decreased, the frictional brake 80 is actuated and the pistons 81 move the shoe and lining assemblies 82 axially along the second axis 22 into contact with opposite sides of the disc 48. Once the shoe and lining assemblies 82 contact the disc 48, the rate of rotation of the disc 48 decreases due to increased friction. It is apparent that the interaction of the frictional brake 80 and the disc 48 are similar to a conventional disc braking system in an automobile which retards the rotation of the automobile's wheels.

The disc 48 is formed from two parts, namely an inner part 86 and an outer part 88. The inner part 86, the hollow shaft 50 and the second side gear 14 could all be formed from a single member, as shown in FIG. 1, in order to be more easily manufactured and to be stronger. The outer part 88 preferable should be formed from a material which interacts well with the shoe and lining assemblies 82 when the frictional brake 80 is activated.

The outer part 88 and the inner part 86 are separated by a torsional coil spring 87. The spring 87 can compress in a tangential direction along the circumference of the inner portion 86 to decrease the suddenness of the actuation of the frictional brake 80 on the disc 48. If the frictional brake 80 is actuated too abruptly, the spring 87 will compress thereby causing the inner portion 86 to slow down more smoothly than the outer portion 88. Accordingly, this will also cause the rate of rotation of the second side gear means 14, and ultimately the output shaft 42, to change more smoothly. It is apparent that the frictional brake 80 and the disc 48 are analogous to conventional disc braking systems.

It is preferable that the disc 48 have a large diameter and that the brake 44 be located at the outer periphery 49 of the disc 48. In this way, the brake 44 can physically contact the outer periphery 49 of the disc 48 which will be moving at a faster tangential velocity than any other part of the disc 48. This will enable the brake 44 to decrease the rate of rotation of the disc 48, and therefore the side gear 14, more effectively.

As shown in FIG. 1, the device 10 is contained within a housing 84. The housing 84 forms part of the automobile within which the device 10 is installed. Furthermore, it is preferred that the frictional brake 80 is connected to the housing 84 by means of bolts 85 in order to be located at the outer periphery 49 of the disc 48 and to be physically connected to a stationary member, such as the housing 84, to be able to stop the rotation of the disc 48.

In the embodiment shown in FIG. 1, the first side gear 12 is toroidally shaped and the output shaft 42 is connected to the first side gear 12 by being passed through the centre of the toroid and being mechanically connected to the inner rim of toroidally shaped first side gear 12. In this way, the entire circumference of the output shaft 42 within the toroidally shaped first side gear means 12 is in contact with the entire circumference of the toroid's inner circle. This large contact surface area between the output shaft 42 and the toroidally shaped side gear 12 provides a better connection between the side gear 12 and the output shaft 42.

In order to further improve the connection, in a preferred embodiment as shown in FIG. 1, the contact surface area is increased by increasing the thickness of the first side gear 12 near the inner circle of the toroid thereby defining a neck portion 70. The entire contact surface area of the inner cylinder defined by the neck 70 and the output shaft 42 within the inner circle can be used to connect the side gear 12 and the output shaft 42 by any known means such as welding or screwing the output shaft 42 into the inner circle of gear 12.

In order to accommodate the neck portion 70, the plate 38 has a recessed portion 38a which extends into the flywheel 60 at the region of the neck 70. This recessed portion 38a also improves the mechanical connection between the casing 36 and the flywheel 60. The neck portion 70 of the first side gear 12 is mechanically separated from the plate 38 by ball bearings 72. As also shown in FIG. 1, there is an elongated member 74 passing from the centre of the recessed portion 38a through the centre of the flywheel 60 and into the input shaft 40.

When the device 10 is installed in an automobile such that the input shaft 40 is attached to an engine 16 and the output shaft 42 is attached to a transmission 18, then whether or not the input shaft 40 causes the output shaft 42 to rotate will depend on the relative resistance to rotation between the first side gear 12 and the second side gear 14. If the brake 44 is not engaged, then the relative resistance to rotation of the second side gear 14 should be lower than that of the first sun gear 12 because the first side gear 12 is attached to the output shaft 42, the transmission 18 and the other parts of the automobile's drive train while the second side gear 14 is only attached to the disc 48 which can rotate freely around the second axis 22. Therefore, when the brake 44 is not engaged, the output shaft 42 shall not be engaged with the input shaft 40 and a gear shift can occur in the transmission 18.

When the brake 44 is actuated, the relative resistance to rotation between the first and second side gears 12 and 14 will change. As the brake 44 is actuated the resistance to rotation of the second side gear 14 will increase. Once the resistance to rotation of the second side gear 14 increases substantially, there will be an increase in the rate of rotation of the first side gear 12 causing the output shaft 42 to rotate and the automobile to move. The increase in the rate of rotation of the first side gear 12 will substantially correspond to the decrease in the rate of rotation of the second side gear 14.

When the brake 44 decreases the rate of rotation of the second side gear 14 to zero, all of the rotational energy of the input shaft 40 will be transferred to the output shaft 42. Therefore, when the second side gear 14 is held stationary by the brake 44, the output shaft 42 will rotate at a rate of rotation which is a function of the relative gear ratio of the first side gear 12 to the second side gear 14.

As shown in FIG. 1, it is preferable if the first and second carried gears 32 and 34 are substantially the same size as each other. The first and second side gears 12 and 14 may be the same size as each other or they could be of different size, in order to obtain the desired rate of rotation of the output shaft 42 with respect to the input shaft 40, as will be described more fully below with respect to FIG. 2(a). In either case, it is preferable if the first and second carried gears 32 and 34 are smaller in size than the first and second side gears 12 and 14.

FIG. 2(a) shows a further embodiment of the present invention shown generally as 100. The device 100 shown in FIG. 2(a) is substantially the same as device 10 shown in FIG. 1 in that both devices 10 and 100 have an input shaft 40 connected to a flywheel 60 and a gear casing 36. Both devices 10 and 100 further have carried gears 32 and 34 mechanically connected to the gear casing 36 by means of axles 33 and 35 and the carried gears 32 and 34 mesh with the gears 12' and 14' as the gear casing 36 carries the carried gears 32 and 34 around the second axis 22. In addition, the first gear 12' is connected to an output shaft 42 and the second gear 14' is connected to a disc 48 which can be acted upon by a brake 44.

However, the device 100 is significantly different from the device 10 because the first gear 12' is a ring gear and has more notches than the second gear 14' which is a sun gear. This creates a gear ratio between the first gear 12' and the second gear 14' which is greater than one.

As shown in FIG. 2(a), the first gear 12' is an internal gear in that the notches are directed radially inward and face towards the second axis 22. The second gear 14' is an external or sun gear in that the notches of the gear 14' face radially outward and face away from the second axis 22. In this way, the diameter of first gear 12' will be greater than the diameter of the second gear 14'. The resulting effect of this arrangement is that the first gear 12' will have a larger number of notches as compared to the second gear 14' and the gear ratio between the first gear 12' and the second gear 14' will be greater than one.

The carried gears 32 and 34, move with respect to the first and second gears 12' and 14' and rotate about axles 33 and 35 as in device 10 shown in FIG. 1. However, because the shape of the first and second gears 12' and 14' is different in FIG. 2(a) as compared to FIG. 1, the carried gears 32 and 34 in FIG. 2(a) are planetary gears and rotate around the second gear 14' as well as about a first and third axis 20 and 21, respectively, which are both parallel to, but not coincident with, the second axis 22.

In operation, when the brake 44 prevents the second gear 14' from rotating, the first gear 12' shall rotate about the second axis 22 at a rate of rotation which is greater than the rate of rotation of the input shaft 40 and will depend on the gear ratio of the first gear 12' to the second gear 14'.

The precise relationship between rotation of the first gear 12' to the second gear 14' when the second gear 14' is held stationary by the brake 44 is $$R_{12} = R_{36} \times \frac{N_{14} + N_{12}}{N_{12}} \quad (1)$$

where $R_{12}$ is the rate of rotation of the first gear 12' in rpm;

$R_{36}$ is the rate of rotation of the gear casing in rpm;

$N_{12}$ is the number of notches on the first gear 12'; and $N_{14}$ is the number of notches on the second gear 14'. Equation (1) reduces to $$R_{12} = R_{36} \frac{N_{14}}{N_{12}} + 1 \quad (2)$$

From Equation (2) it is apparent that the rate of rotation of the first gear 12' will always be greater than the rate of rotation of the gear casing 36 when the second gear 14' is held stationary by the factor $(N_{14}/N_{12}+1)$. In the embodiment shown in FIG. 1, $N_{14}=N_{12}$ and therefore the first side gear 12 will rotate at twice the rate of rotation of the gear casing 36 when the second gear 14' is held stationary. In the embodiment shown in FIG. 2(a), the gear ratio of the second gear 14' to the first gear 12' will be less than one, namely $N_{14}/N_{12}<1$, so that the rate of rotation of the first gear 12' will be between one and two times the rate of rotation of the gear casing 36 when the second gear 14' is stationary.

It is understood that the gear ratio between the first and second gears 12' and 14' shall also affect the incremental changes in rotation of the gear. For instance, when there is an incremental decrease in the rate of rotation of the second gear 14', there will be a corresponding incremental increase in the rate of rotation of the output shaft 42 and this incremental increase in the rate of rotation of the output shaft 42 will depend on the gear ratio of the first and second gears 12' and 14'.

Furthermore, it is also understood that any gear ratio could be used. Preferably, the ratio of the second gear 14' to the first gear 12' is less than one, such that $N_{14}/N_{12}<1$. For example, the first gear 12' could have 60 notches while the second gear 14' could have 40 notches.

From Equations (1 and (2) it is apparent that the number of notches on the carried gears 32 and 34 is not relevant to determining the rate of rotation of the first and second gears 12' and 14'. The only requirement is that the planetary gears 32 and 34 can be placed between the first and second gears 12' and 14' and can be rotatably engageably coupled to both the first and second gears 12' and 14'.

The device 100 shown in FIG. 2(a) can also permit the output shaft 42 to be directly driven by the input shaft 40 such that the relative gear ratio between the first and second gears 12' and 14' is not relevant and the output shaft 42 always turns at the same rate of rotation as the input shaft 40. This is accomplished by mechanically coupling two of the three elements, namely the first gear 12', the second gear 14' or the gear carrier 30, together. In the embodiment shown in FIG. 2(a), this mechanical coupling and uncoupling is performed by lock-up clutch device, shown generally as 102, which can mechanically couple and uncouple the second gear 14' to the gear carrier 30.

By mechanically coupling the gear carrier 30 to the second gear 14' the rotation of the carried gears 32 and 34 about the first and third axes 20 and 21, respectively, is prevented. However, the input shaft 40 shall continue to rotate the gear carrier 30 and the carried gears 32 and 34 about the second axis 22. In this way, the input shaft 40 will be able to turn the flywheel 60, first and second gears 12' and 14', and the gear carrier 30 together in unison without any relative rotation between the first and second gears 12' and 14', the planetary gears 32 and 34, and the gear carrier 30. In other words, the input shaft 40 will directly drive the output shaft 42 when the lock-up clutch 102 couples the second gear 14' to the gear carrier 30. In this case, the lock-up clutch 102 is considered "engaged" because the output shaft 42 cannot rotate at a rate of rotation which is greater than the rate of rotation of the gear carrier 30.

Of course, when lock-up clutch 102 is not coupling the second gear 14' to the gear carrier 30, the output shaft 42 can rotate at a rate of rotation which is greater than the rate of rotation of the input shaft 40 when the second gear 14' is held stationary as described above. In this case, the lock-up clutch 102 is considered to be "disengaged".

In order to accomplish this coupling and uncoupling of the second gear 14' to the gear carrier 30, the overdrive 102 comprises a plate 110 which is slideably engaged within a raised annular portion 104 of the disc 48. The plate 110 can slide axially in the direction of the second axis 22 from the disc 48 to the electromagnet 106 which is fixed to the gear casing 36.

Figure 2C:
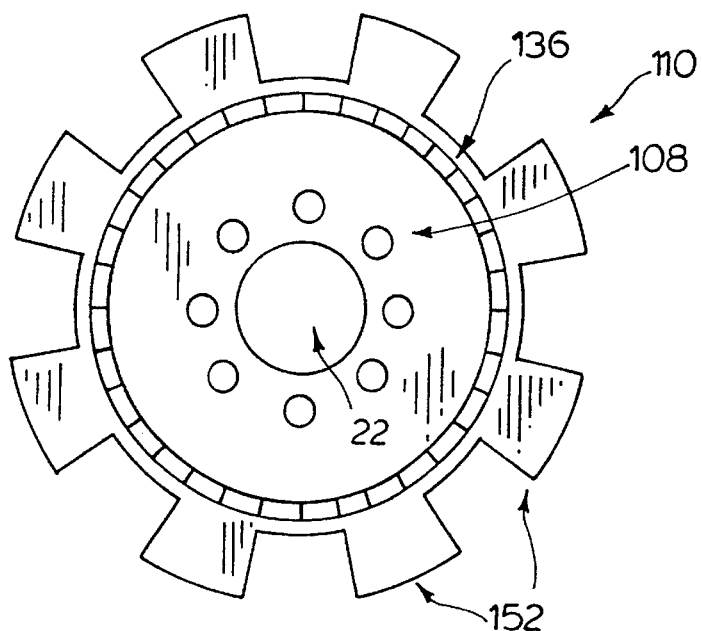
FIG. 2(c) is a diagram of a plate used in the second embodiment of the present invention.
Figure 2D:
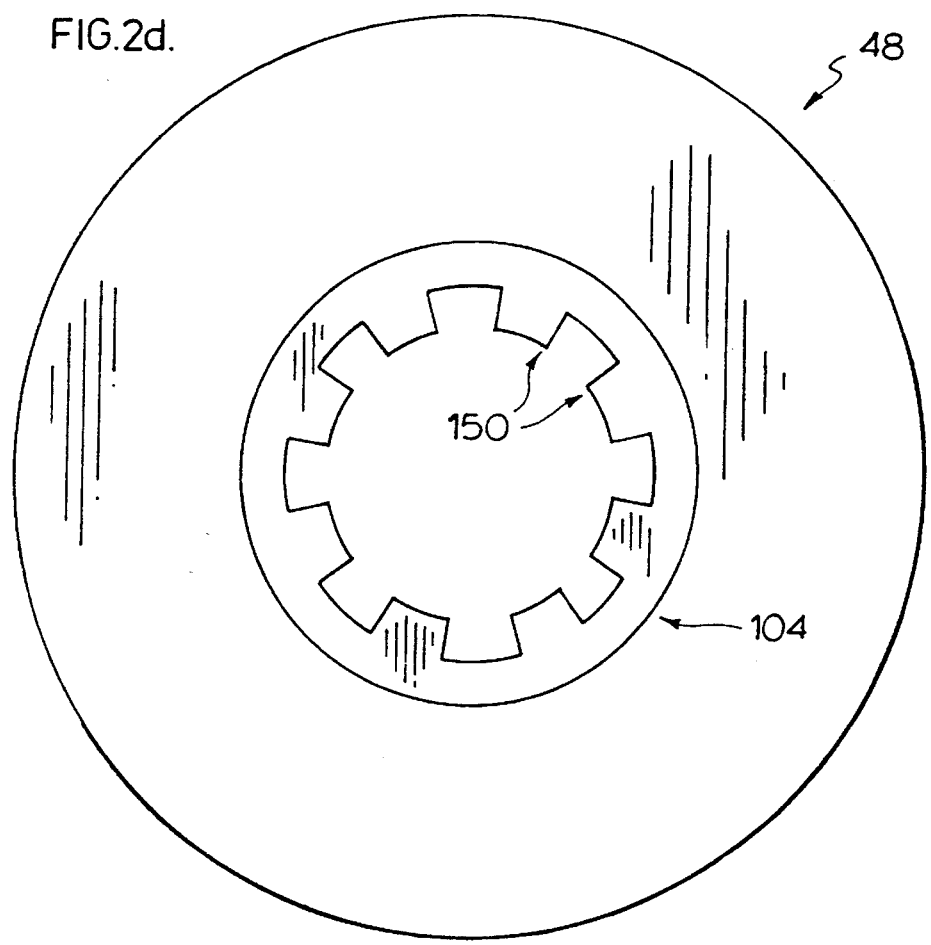
FIG. 2(d) is a diagram of a disc used in the second embodiment of the present invention.

The plate 110 is always in mechanical contact with disc 48 and rotates with disc 48. As shown in FIGS. 2(c) and 2(d), the raised annular portion 104 of the disc 48 has notches 150 which mesh with notches 152 on the plate 110. As shown in FIGS. 2(a) and 2(b), the annular raised portion 104 is sufficiently thick to contact the notches on the outer rim of plate 110, whether the lock-up clutch 102 is engaged (as shown in FIG. 2(*b*)) or disengaged (as shown in FIG. 2(*a*)). Furthermore, the plate 110 has its outer rim offset along the second axis 22 towards the disc 48 to better contact the raised portion 104.

FIG. 2(*a*) shows plate 110 and lock-up clutch 102 in the disengaged mode. When the lock-up clutch 102 is engaged, an electromagnet 106, which is mechanically connected to the gear casing 36, is activated and pulls the plate 110 towards it until the plate 110 is in physical contact with the electromagnet 106 as shown in FIG. 2(*b*). The plate 110 is made from ferrous materials which can be attracted to the electromagnet 106 when the electromagnet 106 is activated.

When the lock-up clutch 102 is disengaged, the electromagnet 106 is deactivated. At this time, spring 120 will move the plate 110 away from the electromagnetic 106 back towards the disc 48. It is understood that the spring 120 should have a force which is lower than the electromagnetic attraction force between the electromagnet 106 and the plate 110. In this way, the electromagnet 106 could overcome the natural biasing force of the spring 120 when activated to move the plate 110 towards it.

As shown in FIGS. 2(*a*), 2(*b*) and 2(*c*), the plate 110 has a plurality of openings 108 arranged symmetrically about the second axis 22 and is annular to permit the shaft 50 to pass through the centre. The electromagnet 106 has a corresponding plurality of pins 109. Each of the openings 108 can fit onto at least one pin 109 when the plate 110 is in physical contact with the electromagnet 106 as shown in FIG. 2(*b*). It is understood that since the electromagnet 106 is mechanically connected to the gear casing 36, the pins 109 are also mechanically connected to the gear casing 36.

When the plate 110 is in physical contact with the electromagnet 106, the openings 108 will have moved onto corresponding pins 109 thereby mechanically coupling the plate 110 to the electromagnet 106 and the gear casing 36. As stated above, the plate 110 is always in mechanical contact with the disc 48 which, in turn, is mechanically connected to the second gear 14'. Accordingly, when the lock-up clutch 102 is engaged, the plate 110 will be attracted by the electromagnet 106 and slide along annular portion 104 to rest on the electromagnet 106 thereby mechanically coupling the second gear 14' to the gear casing 36. As stated above, when the second gear 14' is mechanically coupled to the gear carrier 30, there will be no relative rotation between the gears 12 and 14, 32 and 34 and the output shaft 42 will rotate at the same rate of rotation as the input shaft 40.

It is preferred that the lock-up clutch 102 be engaged (i.e. the plate 110 moved towards the electromagnet 106) when the rate of rotation of the gear carrier 30, and therefore the electromagnet 106, is about the same as the rate of rotation of the disc 48 and therefore the plate 110. To accomplish this, the device 100 utilizes a switch 112 which controls the activation of the electromagnet 106.

As shown in FIG. 3(*a*), the switch 112 comprises a moveable lever 130 which moves on pivot 132 and is substantially triangularly shaped. The switch 112 further comprises a flexible metallic strip 134 which biases the lever 130 into the position shown in FIG. 3(*a*). The first part 131 of lever 130 furthest away from the pivot 132 is in a position to contact the notches 136 on the plate 110 as shown in FIGS. 2(*a*), 2(*b*), 3(*a*), 3(*b*) and 3(*c*).

The switch 112 also comprises first and second electrical contacts 138(*a*) and 138(*b*) which can be closed by a second part 133 of lever 130. The electrical contact 138 is closed when the second part 133 of the lever 130 causes the electrical contacts 138(*a*) and 138(*b*) to touch. When contacts 138(*a*) and 138(*b*) touch they become electrically connected and the electromagnet 106 is activated.

In the embodiment shown in FIG. 3(*a*), the switch 112 is shown in a reference position, such as when the device 100 is not operating. The position of the lever 130 in FIG. 3(*a*) is the position which the flexible metallic strip 134 returns the lever 130 to when notches 136 are not acting on the lever 130.

In FIG. 3(*b*), the switch 112 is shown in the open position in that the contacts 138 are not touching. In this embodiment, the disc 48 is turning at a rate of rotation which is greater than the rate of rotation of the planetary gear carrier 30. This causes notches 136 to move the second part 133 of the lever 130 away from the electrical contacts 138, preventing the electrical contacts 138 from touching.

In FIG. 3(*c*), the gear carrier 30 is moving at a rate of rotation greater than the rate of rotation of the disc 48. In this case, the notches 136 cause the lever 130 to move towards the electrical contacts 138 such that the second part 133 of the lever 130 causes the electrical contacts 138 to touch. When contacts 138 touch, the electromagnet 106 is activated and the brake 44 is disengaged.

It is preferred that the electromagnet 106 is activated when the disc 48 and the gear carrier 30 are rotating at the same rate of rotation or when the disc 48 is rotating at a slightly lower rate of rotation than the gear carrier 30. To accomplish this, the operator of the vehicle raises the rate of rotation of the disc 48 above that of the gear carrier 30 such as by disengaging the brake 44. The operator then disengages the lock-up clutch 102. At this point, the electromagnet 106 shall become activated only when electrical contacts 138 touch. The operator of the vehicle then decreases the rate of rotation of the disc 48 by engaging the brake 44. Once the rate of rotation of the disc 48 substantially equals, or is just slower than, the rate of rotation of the gear carrier 30, lever 130 causes electrical contacts 138 to touch. When contacts 138 touch they become electrically connected, activating the electromagnet 106 and disengaging the brake 44. In this way, the second gear 14 is mechanically coupled to gear carrier 30 and the device 100 is in an (overdrive condition) as seen in FIG. 2(*a*). FIG. 2(*b*) is not in an (overdrive condition).

Figure 4:
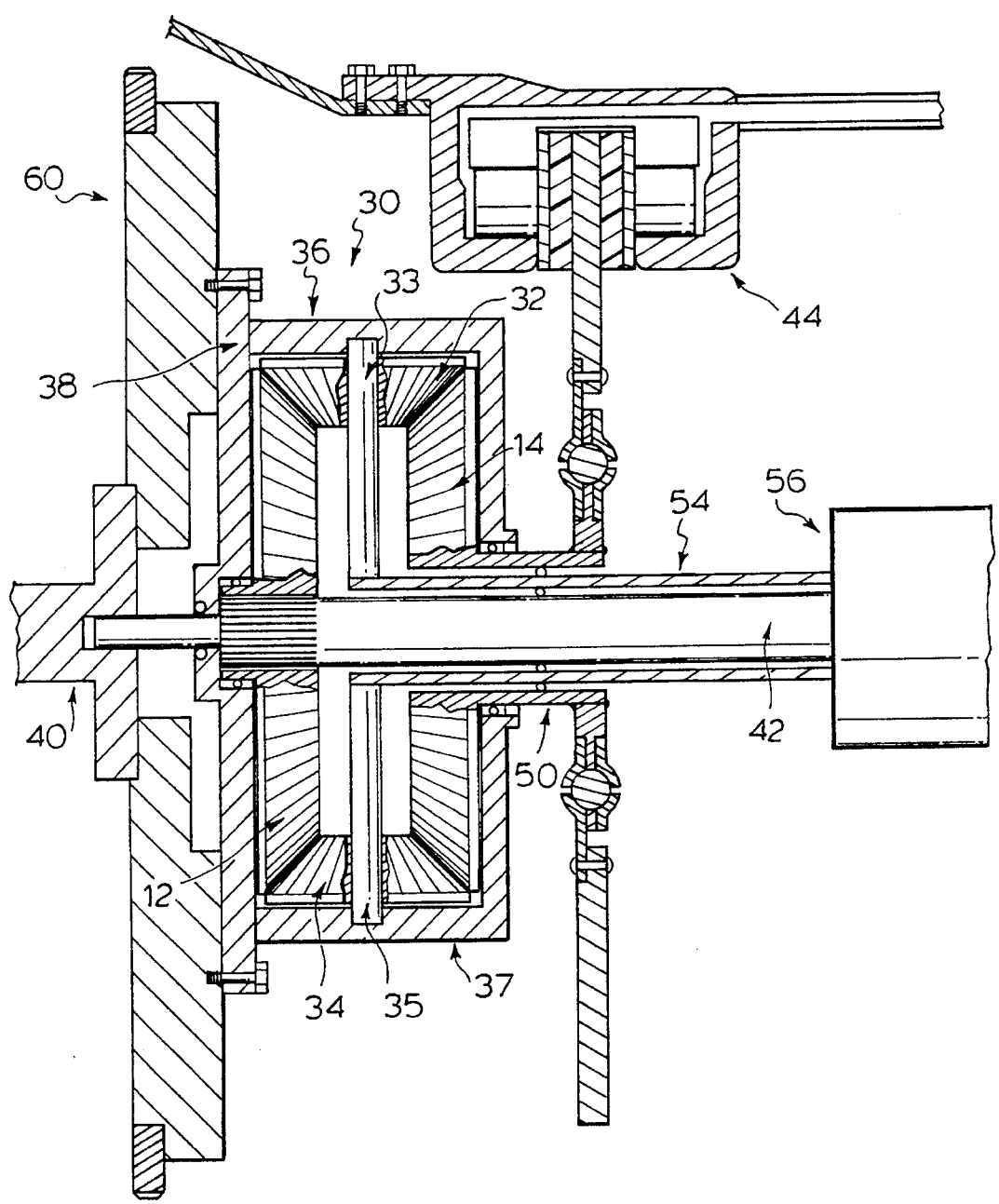
FIG. 4 is a diagram showing a further embodiment of the present invention.

In a third embodiment, as shown in FIG. 4, the device 10 comprises a second hollow shaft 54 connected to the first and second axles 33 and 35. It is noted that whenever the power input shaft 40 is rotating about the second axis 22, the gear carrier 30, along with the axles 33 and 35, will also rotate around the second axis 22. This is the case whether or not the brake 44 or the lock-up clutch 102 are engaged. Therefore, mechanical energy can be obtained from the device 10 by means of the second hollow shaft 54 regardless of whether the brake 44 or the lock-up clutch 102 are engaged. This type of mechanical energy could be used to drive constantly rotating devices or devices that require rotational mechanical power independent of the brake 44 and the lock-up clutch 102. Such an external element could be an automatic transmission 56.

Figure 5:
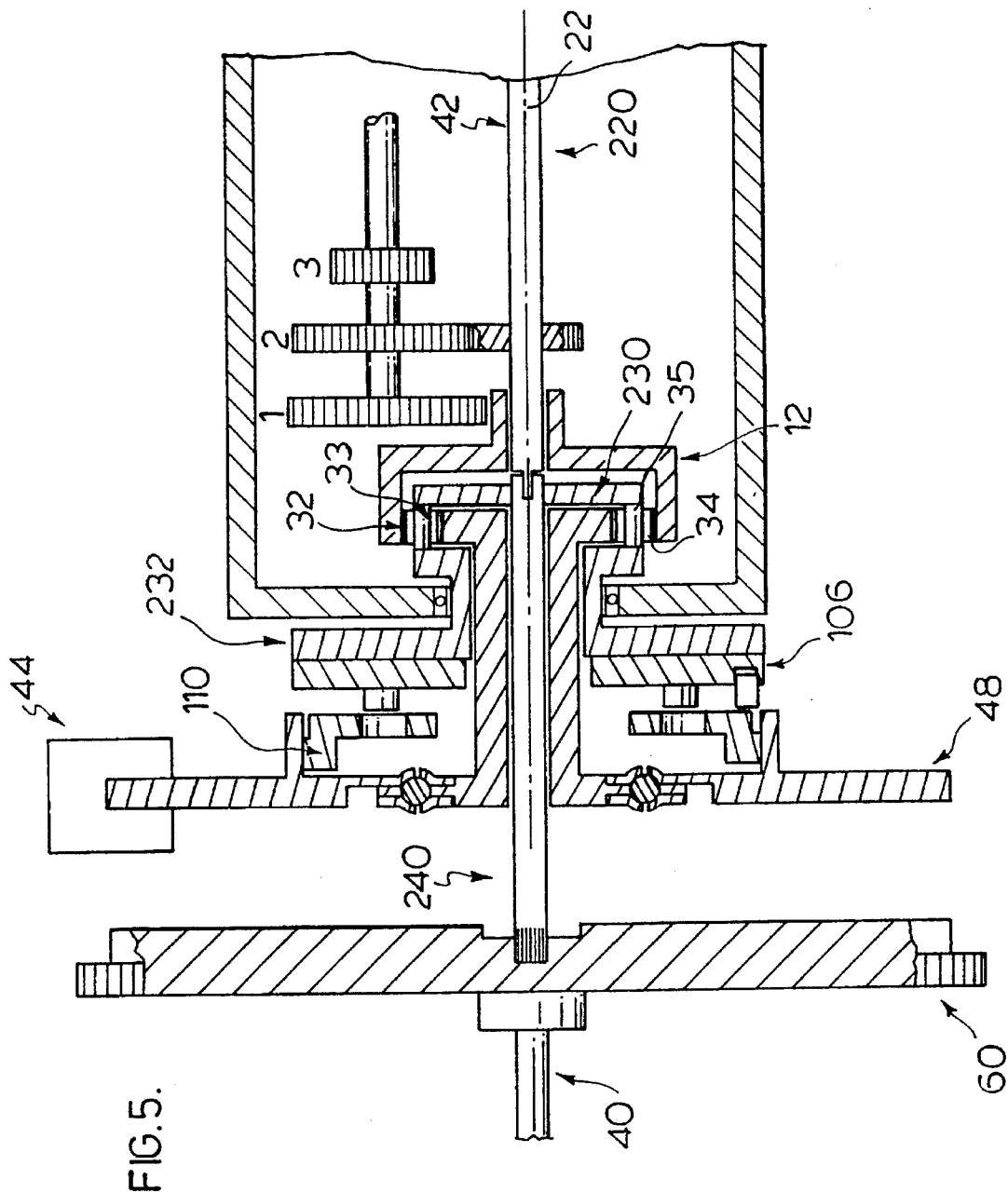
FIG. 5 is a diagram showing a further embodiment of the invention.

FIG. 5 shows a further embodiment of the present invention. As shown in FIG. 5, the input shaft 40 is connected to a flywheel 60 which in turn is connected to a connecting shaft 240 that rotates gear carrier 230. This planetary gear carrier 230 is connected to first and second axles 33 and 35 and by carrying these axles 33 and 35 around the second axis 22, rotate planetary gears 32 and 34 around the second axis 22 in a manner similar to that described above with respect to the embodiment shown in FIG. 2(*a*). A portion 232 of the gear carrier 230 is also connected to electromagnet 106 to effect movement of plate 110 in a manner as described above.

As shown in FIG. 5, this embodiment does not utilize a gear casing 36, but rather locates the first and second gears 12' and 14' within the transmission 220. The first gear 12' is connected to an output shaft 42 by gear 1, and, in this embodiment output shaft 42 is located within the transmission 220. The other elements in FIG. 5, such as the brake 44, the disc 48 and the plate 110, operate in a similar manner to that described with respect to previous embodiments.

It is understood that there need only be one carried gear 32 for the devices 10 or 100 to operate. However, it is preferred that a second carried gear 34 is used to more evenly distribute the rotational forces and to keep the first side gear 12 and second side gear 14, or, the first gear 12' and second gear 14' in place. Likewise, it is understood that more than two carried gears could be used.

In the embodiment shown in FIG. 1 both the first and second carried gears 32 and 34 are rotatable about the first axis 20. However, it is understood that this need not always be the case and the second carried gear 34 could rotate about an axis other than the first axis 20.

It is understood that the essential purpose of the brake 44 is to decrease the rate of rotation of the second side gear 14 or second gear 14' and that it could do this in any known manner. The brake 44 could directly act on the second second gear 14 or 14' or the brake 44 could indirectly act on the second gear 14 or 14', such as by acting on the disc 48.

Furthermore, it is understood that the brake 44 can decrease the rate of rotation of the disc 48 in any known manner such as by frictionally contacting the disc 48 or by producing an electrical field which retards the rotation of the disc 48. In either case, the brake 44 decreases the rate of rotation of the second gear 14 by decreasing the rate of rotation of the disc 48.

It is also understood that the particular gear arrangement shown in FIG. 2(*a*) is a preferred gear arrangement. The first side gear 12' need not be an internal gear and likewise the first and second carried gears 32 and 34 need not rotate about an axis of rotation which is parallel to the second axis 22. It is preferable that the gear ratio between the second gear 14' and the first side gear 12' is less than one however this is done.

It is also understood that the lever 130 as shown in FIGS. 3(*a*), 3(*b*) and 3(*c*) need not be triangularly shaped. Any lever 130 could be used to react to the notches 136 and electrically connect the electrical contacts 138 when the rate of rotation of the disc 48 is equal to or just less than the rate of rotation of the casing 36.

It is also understood that the input shaft 40, the flywheel 60, the gear carrier 30, carried gears 32 and 34, the first and second gears 12' and 14', the disc 48 and the output shaft 42 are preferably all aligned and rotate about a common axis. As shown in FIGS. 1, 2(*a*), 2(*b*) and 4, this common axis is the second axis 22.

It is understood that when the plate 110 is in contact with electromagnet 106 and mechanically couples the second gear 14' to the gear casing 36, this mechanical coupling need only prevent independent rotation of the second gear 14' or the gear casing 36 in one direction and not in both directions. For example, when the plate 110 is in contact with the electromagnet 106, there may still be relative rotation between the electromagnet 106 and the raised annular portion 104 of the disc 48 in one direction, however, in another direction, there is no relative rotation and the electromagnet 106 and the raised annular portion 104 would rotate together and not independently.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. A power transmission device comprising:

first gear means rotatable about a second axis of rotation;

second gear means rotatable about the second axis;

gear carrier means rotatable about the second axis, carrying first carried gear means rotatable about a first axis of rotation and upon a first axle fixed to the gear carrier means, said first carried gear means being disposed between the first gear means and the second gear means and rotatably engageably coupled to both the first gear means and the second gear means;

a power input shaft capable of rotating said gear carrier means about said second axis at a rate of rotation;

a power output shaft mechanically connected to said first gear means and capable of turning at a rate of rotation in a first direction;

braking means mechanically associated with said second gear means and capable of decreasing a rate of rotation of said second gear means in said first direction toward zero;

wherein when the braking means decreases the rate of rotation of said second gear means in the first direction there is a corresponding increase in the rate of rotation of said power output shaft in the first direction; and wherein the first axle is connected to a first hollow shaft about the output shaft to provide power to an automatic transmission.

2. A power transmission device as defined in claim 1 wherein the first axis of rotation is transverse to the second axis of rotation.

3. A power transmission device as defined in claim 1 wherein the first axis of rotation is parallel to the second axis of rotation.

4. A power transmission device as defined in claim 1 wherein the gear carrier means comprises a gear casing within which are contained the first carried gear means, the first gear means and the second gear means;

wherein the first axle is fixed to said casing; and wherein the input shaft rotates the gear carrier means about the second axis by rotating the casing about said second axis.

5. A power transmission device as defined in claim 4 wherein the output shaft is journaled coaxially within the second gear means.

6. A power transmission device as defined in claim 5 further comprising disc means mechanically connected to said second gear means such that the disc means rotates about said second axis at the same rate and in the same direction as the second gear means; and wherein said braking means engages said disc means to decrease the rate of rotation of said second gear means by decreasing the rate of rotation of said disc means.

7. A power transmission device as defined in claim 6 wherein the disc means is mechanically connected to said second gear means by a second hollow shaft coaxially about the first hollow shaft.

8. A power transmission device as defined in claim 1 wherein the gear ratio of the second gear means to the first gear means is less than one.

9. A power transmission device as defined in claim 7 wherein the gear ratio of the second gear means to the first gear means is less than one.

10. A power transmission device as defined in claim 9 wherein the first axis of rotation is parallel to the second axis of rotation.

11. A power transmission device as defined in claim 8 further comprising a lock-up clutch means associated with said second gear means and said gear carrier means and capable of mechanically coupling the second gear means to the gear carrier means; and wherein when the lock-up clutch means mechanically couples the second gear means to the gear carrier means, the first carried gear means is prevented from rotating about the first axis and the output shaft rotates at the same rate of rotation as the input shaft.

12. A power transmission device as defined in claim 10 further comprising a lock-up clutch means associated with said second gear means and said gear carrier means and capable of mechanically coupling the second gear means to the gear carrier means; and wherein when the lock-up clutch means mechanically couples the second gear means to the gear carrier means, the first carried gear means is prevented from rotating about the first axis and the output shaft rotates at the same rate of rotation as the input shaft.

13. A power transmission device as defined in claim 12 wherein the lock-up clutch means mechanically couples the second gear means to the gear carrier means by mechanically coupling the disc means to the gear casing.

14. A power transmission device comprising:

first gear means rotatable about a second axis of rotation;

second gear means rotatable about the second axis;

gear carrier means rotatable about the second axis, carrying first carried gear means rotatable about a first axis of rotation upon a first axle and disposed between the first gear means and the second gear means and rotatably engageably coupled to both the first gear means and the second gear means, said gear carrier means comprising a gear casing within which are contained the first carried gear means, the first gear means and the second gear means wherein the first axle is fixed to said casing;

a power input shaft capable of rotating said gear carrier means about said second axis at a rate of rotation by rotating the gear casing about said second axis;

a power output shaft mechanically connected to said first gear means and capable of turning at a rate of rotation in a first direction, said power output shaft being journaled coaxially within the second gear means and rotatable about the second axis;

disc means mechanically connected to said second gear means by a first hollow shaft coaxially about the output shaft such that the disc means rotates about said second axis at the same rate and in the same direction as the second gear means;

braking means for engaging said disc means to decrease the rate of rotation of said second gear means in the first direction toward zero by decreasing the rate of rotation of said disc means;

wherein the gear ratio of the second gear means to the first gear means is less than one;

wherein the first axis of rotation is parallel to the second axis of rotation;

wherein when the braking means decreases the rate of rotation of said second gear means in the first direction there is a corresponding increase in the rate of rotation of said power output shaft in the first direction; and lock-up clutch means associated with said second gear means and said gear carrier means and capable of mechanically coupling the second gear means to the gear carrier means, said lock-up clutch means comprising:

plate means mechanically coupled to said disc means and rotatable about the second axis with said disc means;

electromagnetic means mechanically coupled to the gear casing and capable of moving the plate means axially in the direction of the second axis from the disc means toward the gear casing;

pin means mechanically associated with said electromagnetic means and comprising a plurality of pins;

wherein when the lock-up clutch means mechanically couples the second gear to the gear carrier means, the first carried gear means is prevented from rotating about the first axis and the output shaft rotates at the same rate of rotation as the input shaft;

wherein the lock-up clutch means mechanically couples the second gear means to the gear carrier means by mechanically coupling the disc means to the gear casing; and wherein the plate means has opening means comprising a plurality of openings oriented radially about the second axis such that when the electromagnetic means moves the plate means toward the gear casing, each pin fits into at least one opening.

15. A power transmission device as defined in claim 14 wherein the locked-up clutch means further comprises a switch means which substantially simultaneously activates the electromagnetic means and disengages the brake means when the rotation of the disc means about the second axis is substantially the same as the rotation of the gear casing about the second axis.

16. A power transmission device as defined in claim 15 wherein the switch means comprises:

first and second electrical contacts which activate the electromagnetic means when electrically connected;

lever means having a first part and a second part, said first part being mechanically engageable with the plate means and said second part being mechanically engageable with the electrical contacts;

wherein when the rate of rotation of the plate means is greater than rate of rotation of the gear casing the plate means moves the first part of the lever means in a first direction such that the second part of the lever means does not engage the electrical contacts; and wherein when the rate of rotation of the plate means is less than the rate of rotation of the gear casing the plate means moves the first part of the lever means in a second direction such that the second part of the lever means engages the electrical contacts causing them to become electrically connected.

17. A power transmission device as defined in claim 13 wherein the gear carrier means further comprises a second carried gear, said second carried gear being rotatable about a third axis substantially parallel to the first axis and upon a second axle fixed to said gear casing;

wherein the second axle is connected to the first hollow shaft;

wherein the first and second carried gears are substantially the same size;

wherein the first gear means comprises an internal gear;

wherein the second gear means comprises an external gear smaller than the first gear means; and wherein the first and second carried gears are smaller than the first and second gear means.

18. A power transmission device as defined in claim 16 wherein the carried gear means further comprises a second carried gear, said second carried gear being rotatable about a third axis substantially parallel to the first axis and upon a second axle fixed to said gear casing;

wherein the first and second carried gears are substantially the same size;

wherein the first gear means comprises an internal gear;

wherein the second gear means comprises an external gear smaller than the first gear means; and wherein the first and second carried gears are smaller than the first and second gear means.

19. A power transmission device as defined in claim 18 further comprising a flywheel mechanically connected to said input shaft.

20. A power transmission device as defined in claim 19 wherein the first and second axles are connected to a second hollow shaft which passes within the first hollow shaft and about the output shaft to provide power to an automatic transmission.

* * * * *